US006577934B2

(12) United States Patent
Matsunaga et al.

(10) Patent No.: US 6,577,934 B2
(45) Date of Patent: Jun. 10, 2003

(54) FAILURE DIAGNOSIS APPARATUS

(75) Inventors: Takanori Matsunaga, Tokyo (JP); Toshinori Matsui, Tokyo (JP); Takashi Maeda, Tokyo (JP); Hiroshi Fujioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/888,375

(22) Filed: Jun. 26, 2001

(65) Prior Publication Data

US 2002/0116103 A1 Aug. 22, 2002

(30) Foreign Application Priority Data

Feb. 22, 2001 (JP) ...................................... 2001-047264

(51) Int. Cl.[7] ......................... G01M 15/00; G06F 15/20

(52) U.S. Cl. ......................... 701/29; 702/183; 702/188; 714/25; 714/30; 714/34; 714/46; 340/825.6; 340/825.06; 340/438

(58) Field of Search ............................. 701/29, 30, 33, 701/34, 43, 35; 340/825.16, 825.06, 439, 438; 714/25, 37, 30, 31, 46; 702/183, 184, 186, 188

(56) References Cited

U.S. PATENT DOCUMENTS 5,056,023 A * 10/1991 Abe ........................... 340/439
5,157,610 A * 10/1992 Asano et al. .............. 73/117.3
5,313,388 A * 5/1994 Cortis ......................... 73/116
5,343,472 A * 8/1994 Michihira et al. ......... 370/85.6
5,467,272 A * 11/1995 Yoshida et al. ........ 340/825.02
5,483,692 A * 1/1996 Person et al. ............ 455/238.1
5,521,588 A * 5/1996 Kuhner et al. ......... 340/825.22
5,631,831 A * 5/1997 Bird et al. .................... 73/116
5,737,711 A * 4/1998 Abe ............................ 701/29
6,006,146 A * 12/1999 Usui et al. ..................... 701/29
6,075,438 A * 6/2000 Abe et al. .............. 340/286.01
6,114,970 A * 9/2000 Kirson et al. .......... 340/825.52
6,128,560 A * 10/2000 Ishii ............................ 701/29
6,131,538 A * 10/2000 Kanai ............................ 123/2
6,141,710 A * 10/2000 Miesterfeld ................. 710/100
6,282,469 B1 * 8/2001 Rogers et al. ................ 701/29
6,321,148 B1 * 11/2001 Leung ......................... 701/29
6,330,499 B1 * 12/2001 Chou et al. .................... 701/33
6,346,876 B1 * 2/2002 Flick .......................... 340/426
6,396,164 B1 * 5/2002 Barnea et al. ............. 307/10.1
6,396,395 B1 * 5/2002 Zielinski et al. ......... 340/425.5
2001/0002450 A1 * 5/2001 Mizutani et al. .............. 701/33
2001/0025323 A1 * 9/2001 Mizutani et al. .............. 701/33

FOREIGN PATENT DOCUMENTS

JP 62-94442 4/1987
JP 62-161037 7/1987
JP 2000-182188 6/2000

* cited by examiner

*Primary Examiner*—Thomas G. Black
*Assistant Examiner*—Tuan To
(74) *Attorney, Agent, or Firm*—Sughrue Mion, PLLC

(57) ABSTRACT

A failure diagnosis apparatus for a vehicle enables communications between a gateway, which automatically and effectively collects information on a condition of a vehicle having a plurality of network buses, and an information center outside the vehicle in an automatic and efficient manner. A failure diagnosis section is mounted on the gateway installed on the vehicle. The vehicle-installed gateway has a connecting section for connection to information communications terminals such as portable telephones through wireless communications. In addition, the vehicle-installed gateway has a protection processing section for performing security processing on possession information possessed by the gateway.

17 Claims, 10 Drawing Sheets

FIG. 12

126

| FAILURE PHENOMINA | FAILURE PHENOMINA (DETAILS) | DIAGNOSIS PROCEDURES |
|---|---|---|
| UNABLE TO START WELL | NOT STARTED | BATTERY VOLTAGE, IGNITION COIL, INJECTOR |
| | STARTING TIME IS LONG | BATTERY VOLTAGE, IGNITION COIL, INJECTOR, STEPPING MOTOR |
| BEHAVIOR DURING TRAVELLING IS ABNORMAL | BREATHING,LIMPING | IGNITION COIL, INJECTOR, STEPPING MOTOR, FUEL PRESSURE, COMPRESSION PRESSURE |
| | SHOCK UPON ACCELERATION | IGNITION COIL |
| | SHOCK UPON DECELERATION | STEPPING MOTOR, THROTTLE POSITION SENSOR, IDLE SWITCH |
| | KNOCKING | IGNITION COIL, KNOCK SENSOR |
| IDLING IS ABNORMAL | IDLING IS UNSTABLE | IGNITION COIL, INJECTOR, STEPPING MOTOR, IGNITION TIMING |
| | IDLING r.p.m. IS HIGH | INJECTOR, STEPPING MOTOR, WATER TEMPERATURE SENSOR, A/C SWITCH |
| | IDLING r.p.m. IS LOW | INJECTOR, STEPPING MOTOR, WATER TEMPERATURE SENSOR |

FAILURE DIAGNOSIS APPARATUS

This application is based on Application No. 2001-047264, filed in Japan on Feb. 22, 2001, the contents of which are hereby incorporated by reference.

BACKGROUND OF THE INVENTION

1. Field of the Invention

The present invention relates to a failure diagnosis apparatus for a vehicle which performs a failure diagnosis on the vehicle having a variety of electronic controllers based on information about two or more of the electronic controllers.

2. Description of the Related Art

In the past, such a failure diagnosis apparatus was proposed, for example, in Japanese Patent Application Laid-Open No. 62-161037. In this failure diagnosis apparatus, a plurality of electronic controllers are connected with one another through a common network bus in a typical vehicle in the form of a motor car. Operating conditions in the respective electronic controllers are collected by a failure diagnosis apparatus through the network bus, so that the failure diagnosis apparatus carries out a failure diagnosis based on the mutual relations between the electronic controllers.

On the other hand, it is conceived that failure diagnosis information is transmitted to an external information center (i.e., an information center outside a vehicle) for failure diagnosis service by using a radio communications device installed on a vehicle, as described in Japanese Patent Application Laid-Open No. 62-94442. However, this system involves a problem in that it is necessary to install the radio communications device on the vehicle, thus increasing the cost of the vehicle. To cope with this problem, there has been proposed a method of providing failure diagnosis service by connecting an information communications terminal such as a portable telephone with electronic controllers installed on a vehicle, as described in Japanese Patent Application Laid-Open No. 2000-182188.

As referred to above, in the case of a vehicle equipped with a failure diagnosis apparatus, however, it is the current state of the art that a plurality of network buses corresponding to respective electronic controllers mounted on a vehicle are required to be installed on the vehicle owing to restrictions such as performance, cost, etc., of the electronic controllers. Therefore, there is a problem that it is difficult to connect all the electronic controllers with a common network bus.

Besides, in the method of providing failure diagnosis service by connecting an information communications terminal such as a portable telephone with electronic controllers installed on a vehicle in order to enable communications between the vehicle and an external information center, wiring arrangements, connecting operations and the like are required for the purpose of making portable telephones available to this end. Thus, there are the following problems; the assembly cost increases, and the user feels troublesomeness, etc.

In addition, in respect of connection with information communications terminals, there is a difference between the life cycle of the information communications terminals, such as portable phones, and the life cycle of vehicles, such as motor cars. Consequently, there arises the problem that when the service user has changed his or her portable telephone, the user might become unable to use the current service.

Further, in cases where an information communications terminal is connected with a navigation unit, etc., there is also a problem that it is impossible to diagnose a device for controlling a door lock under the condition of the navigation unit being unable to operate, such as when the engine is being started, when an ignition key is in an "OFF" state, etc.

Furthermore, in the conventional failure diagnosis service using communications with an external information center, the diagnosis service using external communications (i.e., communications between a vehicle and the external information center) is not provided except when there takes place a failure in the vehicle or when the external information center makes a request to the target vehicle to be serviced. Therefore, as long as failure does not occur in the vehicle, the driver cannot utilize the diagnosis service to any satisfactory extent. Moreover, when the information center makes a request to vehicles, it is necessary for the information center to keep track of the operating situations of all the vehicles to be serviced. For these reasons, it is difficult to increase profits on the side of service providers.

On the other hand, the vehicle information such as operating condition information, failure diagnosis information and the like includes position information on the driver's own vehicle, time and speed informtion at passing locations, etc. Therefore, when the vehicle information is leaked outside the vehicle, there might be the occurrence of damage to privacy, money and the like. However, since information protection processing means for preventing this are scattered in respective electronic controllers, there are problems such as high cost, a long period of development or the like in achieving the effective protection of such information.

Moreover, there is a further problem in that in case of diagnosing a failure by means of a diagnosis device installed in the place of a dealer, it takes a long time for the dealer specify the cause for the failure if the details of the failure are accurately communicated to the dealer. Or, there is a problem in that when diagnosing a failure, it is necessary for a dealer to sufficiently understand a diagnosis manual and perform a failure diagnosis in accordance with a suitable diagnosis procedure, thus resulting in an inefficient operation.

SUMMARY OF THE INVENTION

The present invention is made in view of the above situations, and has for its object to provide a failure diagnosis apparatus for a vehicle which is capable of collecting the information on the condition of a vehicle having a plurality of network buses in an automatic and effective manner thereby to carry out a failure diagnosis on the vehicle, Another object of the present invention is to provide a failure diagnosis apparatus for a vehicle which is capable of communicating automatically and efficiently with an information center outside the vehicle.

Bearing the above objects in mind, according to the present invention, there is provided a failure diagnosis apparatus for a vehicle in which a plurality of electronic controllers mounted on the vehicle are connected with one another by means of a plurality of network buses for transmitting data between the electronic controllers through the network buses, the apparatus including a gateway with a protocol conversion section for enabling the plurality of electronic controllers to mutually communicate with one another through the plurality of network buses. The gateway comprises: an information acquisition section for acquiring control information or diagnosis information about diagnoses respectively performed by the plurality of electronic controllers; and a failure diagnosis section for diagnosing failure of the vehicle by using the control information or diagnosis information acquired by the information acquisition section.

In a preferred form of the present invention, the failure diagnosis apparatus for a vehicle further comprises an information communications terminal connecting section adapted to be connected to an information communications terminal through wireless communications to enable communications with a device outside the vehicle.

In another preferred form of the present invention, the information communications terminal connecting section is replaceable with another one according to a change of the information communications terminal.

In a further preferred form of the present invention, the gateway further comprises an intrinsic information storage section which acquires intrinsic information possessed by the information communications terminal and stores the acquired intrinsic information of the information communications terminal.

In a yet further preferred form of the present invention, the gateway starts a diagnosis when detected information on a condition of the vehicle satisfies a prescribed condition.

In a still further preferred form of the present invention, the gateway further comprises an information protection processing section for performing protection processing of possession data, the information obtained from the plurality of electronic controllers connected with the plurality of network buses being protected by using the information protection processing section.

In a further preferred form of the present invention, the gateway further comprises a power supply control section which is connected with a power supply for supplying power to a CPU when an ignition key is in an "OFF" state, thereby enabling the gateway to perform a prescribed operation in the state of the ignition key being turned off.

In a further preferred form of the present invention, the gateway cancels a diagnosis service under use based on a diagnosis service cancellation signal.

In a further preferred form of the present invention, the failure diagnosis apparatus for a vehicle further comprises: a data base having information about failure phenomena and diagnosis procedures necessary to diagnose the failure phenomena; a retrieval section for retrieving the data base for the diagnosis procedures based on the failure phenomena; and a trouble diagnosis section for acquiring a diagnosis procedure for diagnosing a failure phenomenon generated in the vehicle by retrieving the data base by use of the retrieval section, the trouble diagnosing section being operable to diagnose the plurality of controllers according to the diagnosis procedure acquired.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 12 is an explanatory view illustrating one example of the content of a data base 120 depicted in FIG. 11.

DESCRIPTION OF THE PREFERRED EMBODIMENTS

Now, preferred embodiments of the present invention will be described in detail while referring to the accompanying drawings.

Embodiment 1

Figure 1:
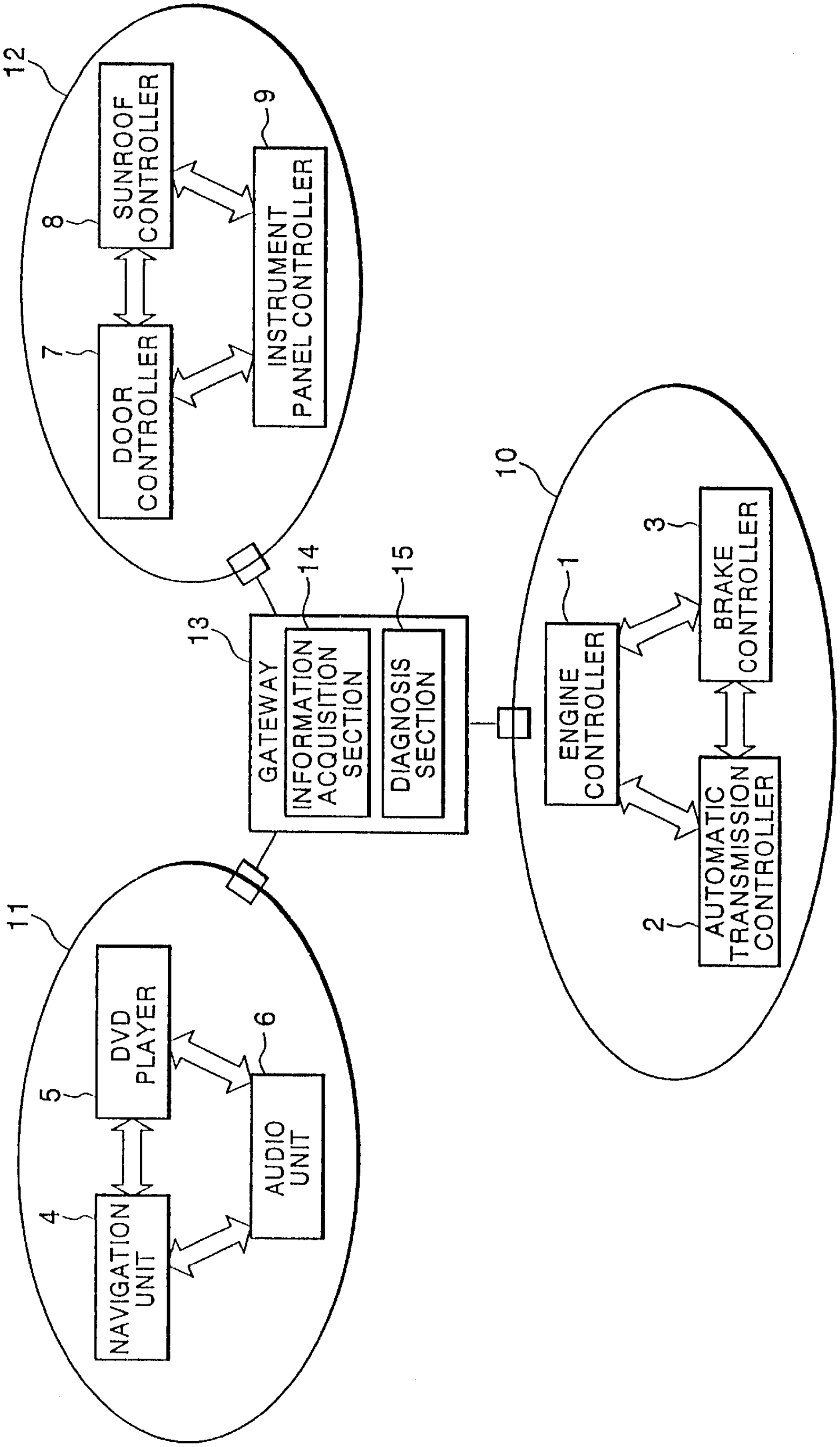
FIG. 1 is a block diagram illustrating the construction of a first embodiment of the present invention.

FIG. 1 illustrates, in a block diagram, the construction of a failure diagnosis apparatus for a vehicle according to a first embodiment of the present invention. In FIG. 1, electronic controllers installed on this vehicle includes the following components 1 through 9. An engine controller 1 controls the amount of fuel injection, ignition timing, an idle control valve for an engine of the vehicle. An automatic transmission controller 2 calculates the gear ratio of a transmission based on the relation between the speed and the number of revolutions per unit time of the engine, and generates instructions to a transmission control valve so as to control the gear ratio to a target gear ratio. A brake controller 3 changes the braking forces of brakes so that the wheels of the vehicle are not locked during application of the brakes. The electronic controllers 1 through 3 constitute a network system 10, which is hereinafter called "a control system 10".

A navigation unit or controller 4 measures the current position of the vehicle, and provides the guidance of a route to the destination and surroundings information while using map information. A DVD player or controller 5 reads in data from a storage device which stores video data such as a movie, map information, etc., displays the data as an image, or supplies the data to the navigation unit 4. An audio unit or controller 6 has a function of reproducing music data. Here, note that the electronic controllers 4 through 6 constitute a network system 11, which is hereinafter called "an information system".

A door controller 7 opens and closes a door lock by detecting when a door lock button is pressed down by the user, and similarly controls the vertical motion of each window glass. A sunroof controller 8 opens and closes a sunroof. An instrument panel controller 9 controls the display of various meters, such as the running speed and mileage of the vehicle, the number of revolutions per unit time of the engine, etc. Here, note that the electronic controllers 7 through 9 together constitute a network system 12, which is hereinafter called "a body system".

A gateway 13, to which the above-mentioned control system 10, information system 11 and body system are connected through a plurality of network buses, includes an information acquisition section 14, and a diagnosis section 15. The information acquisition section 14 has a protocol conversion section for enabling mutual communications between the plurality of electronic controllers through the plurality of network buses, aquires all or part of the information (i.e., diagnosis information and/or control information obtained by the respective electronic controllers) possessed by the respective electronic controllers of the respective systems 10 through 12 by way of the network buses, and stores vehicle information (i.e., information on the vehicle). The diagnosis section 15 diagnoses the vehicle based on the information acquired by the information acquisition section 14.

Here, note that each of the electronic controllers 1 through 9 may have a self-diagnosis function of diagnosing whether each of sensors, actuators, etc., of each object to be controlled is normal or abnormal. Moreover, the electronic controllers 1 through 9 may transmit their self-diagnosis information to the network buses with which they are connected respectively.

Here, it is to be noted that in the control system 10, the transmission of important data, which might affect the safety of the vehicle, has to be conducted in a reliable manner, so it is required to construct a network by using dependable buses. In addition, it is also indispensable to prevent the problem of needless data from being input to the control system 10 from the outside of the vehicle.

In the information system 11, a large amount of data has to be transmitted at high speed, so it is necessary to construct the network by using buses which allow data transmission at high-speed and with a large quantity. A transceiver and a controller which control the data flowing through the buses are comparatively expensive, and accordingly, a high-performance CPU is required to be mounted on each of the electronic controllers of the information system 11.

On the other hand, in the body system 12, the required transmission rate is relatively low and may be at such a level as not to give the user a feeling of uncomfortableness, and the amount of data to be transmitted is not so large. However, low-cost and reliable network buses are required so as not to raise the price of the vehicle. Also, for controllers and CPUs controlling the data transmission in the body system 12, there are used low-cost ones having reduced functions.

In the above-mentioned construction, for example, each of the electronic controllers, which constitute the control system 10, has a self-diagnosis function, and carries out a failure diagnosis so as to detect abnormalities or malfunctions of sensors, actuators and the like during travelling of the vehicle. Here, it is assumed that each of the electronic controllers in the other systems 11 and 12 does not has such a self-diagnosis function.

In this case, the gateway 13 is able to acquire the results of self-diagnosis conducted by each of the electronic controllers of the control system 10 by the use of the information acquisition section 14. With respect to the respective electronic controllers constituting the other systems 11 and 12, the gateway 13 acquires control information flowing on the respective network buses which constitute the information system 11 and the body system 12 by using the information acquisition section 14, and performs failure diagnoses by the use of the diagnosis section 15 based on the acquired information. That is, even in the case of the electronic controllers of the body system 12 which are not permitted to be directly connected with high-speed and costly network buses as utilized in the information system 11 due to cost restrictions, or in the case of the electronic controllers of the control system 10 which are also not permitted to be connected with the high-speed and costly network buses so as to prevent the incoming of a great deal of data as those flowing through the information system 11 due to safety restrictions, the information possessed by the respective electronic controllers mounted on the vehicle can be collected, thus making it possible to conduct failure diagnoses.

Thus, according to the above-mentioned first embodiment, even with a vehicle having difficulty in connecting all the electronic controllers with a common network bus and having a plurality of different kinds of network buses, it is possible to collect the operating conditions of the respective electronic controllers through the network buses, whereby a comprehensive diagnosis can be made by performing failure diagnoses based on mutual relations between the respective electronic controllers.

Embodiment 2

Figure 2:
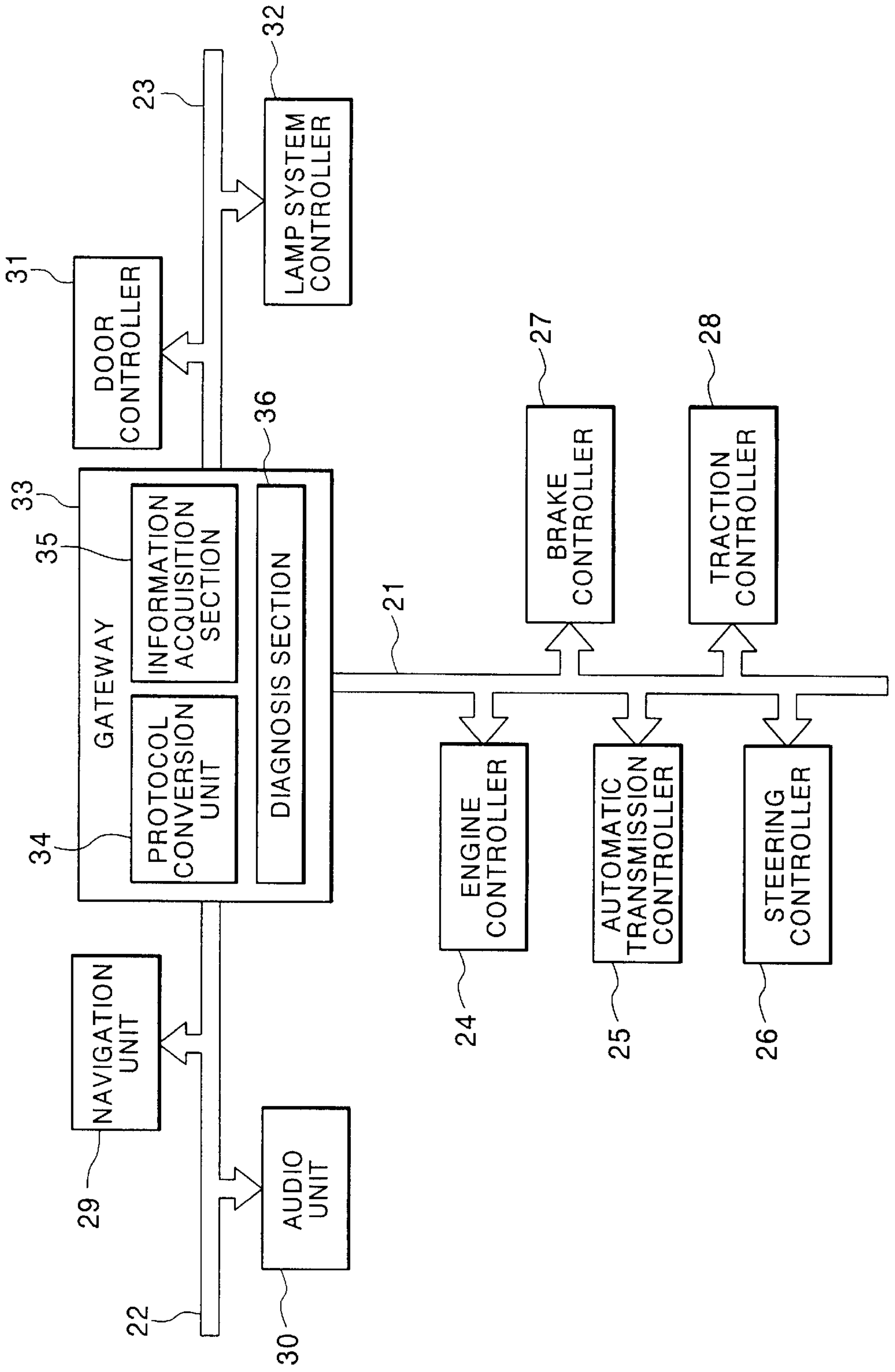
FIG. 2 is a block diagram illustrating the construction of a second embodiment of the present invention.

FIG. 2 illustrates, in a block diagram, the construction of a failure diagnosis apparatus for a vehicle according to a second embodiment of the present invention. In FIG. 2, the failure diagnosis apparatus according to this embodiment includes by a plurality of network buses 21 through 23 installed on a vehicle, and a plurality of electronic controllers 24 through 32 mounted on the vehicle and connected with these network buses 21 through 23. An engine controller 24 controls the fuel injection amount and the ignition timing for an engine of the vehicle, and also controls an idle control valve. An automatic transmission controller 25 calculates the gear ratio of a transmission from the relation between the speed and the number of revolutions per unit time of the engine, and generates an instruction to a control valve of the transmission so as to control the calculated gear ratio to a target gear ratio. A steering controller 26 controls a steering motor so as to assist the driver's steering wheel operation. A brake operating unit 27 changes the braking forces of brakes so that the wheels of the vehicle are not locked during braking application. A traction controller 28 generates an instruction to decrease the number of revolutions per unit of the engine so that the wheels of the vehicle do not slip or idle during rapid acceleration or during running on a snowy road, etc.

These electronic controllers 24 through 28 share the respective control data by sending and receiving them through the network bus 21. The network bus 21 and the electronic controllers 24 through 28 are generally called a control system for convenience of description.

The navigation unit 29 measures the current position of the vehicle, and provides the guidance of a route to the destination and surroundings information by using map information. An audio unit 30 has a function of reproducing music data. These units 29 and 30 share control information such as a play instruction, a volume adjustment instruction and the like, vedio information, etc., by sending and receiving them by way of the network bus 22. The network bus 22 and the units 29 through 30 are generally called "an information system" for convenience of description.

A door controller 31 opens and closes a door lock by detecting when the user presses down a door lock button, and also controls the vertical motion of each window glass in a similar manner. A lamp system controller 32 controls head lamps, winkers, brake lamps, a room lamp, etc. The network bus 23 and the electronic controllers 31 and 32 are generally called "a body system" for convenience of description.

The respective network buses 21 through 23 of the above-mentioned control system, information system and body system are connected with a gateway 33. A protocol conversion section 34 processes or converts data sent from a sender into a form conforming to the standard of a network bus on a transmitted or receiver side in the respective electronic controllers 24 through 32 in order to make it possible to perform data sending and receiving therebetween, for example, between the engine controller 24 connected with the network bus 21 of the control system and the navigation unit 29 connected with the network bus 22 of the information system, and sends the converted data to the transmitted or receiver side network bus.

An information acquisition section 35 acquires all or part of the information possessed by the respective electronic controllers on the respective network buses 21 through 23 by way of the network buses 21 through 23, and stores vehicle information thus obtained. A diagnosis section 36 comprehensively judges the information acquired by the information acquisition section 35, and diagnoses the state of the vehicle.

Here, note that each of the electronic controllers 24 through 32 may have a self-diagnosis function of diagnosing whether sensors, actuators and the like for each object to be controlled are normal or abnormal. Moreover, each of the electronic controllers 24 through 32 may transmit self-diagnosis information to a network bus connected therewith.

Here, one sample will be shown in which an integrated diagnosis of the vehicle is carried out by means of the diagnosis section 36 installed on the gateway 33.

First of all, to monitor the driver's steering operation, the steering controller 26 acquires the steering angle of a steering wheel from a steering sensor and sends it to the network bus 21. In addition, to give route guidance on the destination, the navigation unit 29 collects vehicle position information from a GPS receiver, etc. The navigation unit 29 also collects information indicative of the direction or heading of the vehicle, and sends it to the network bus 22. The gateway 33 acquires the steering angle and the vehicle position information by means of the information acquisition section 35.

Figure 3:
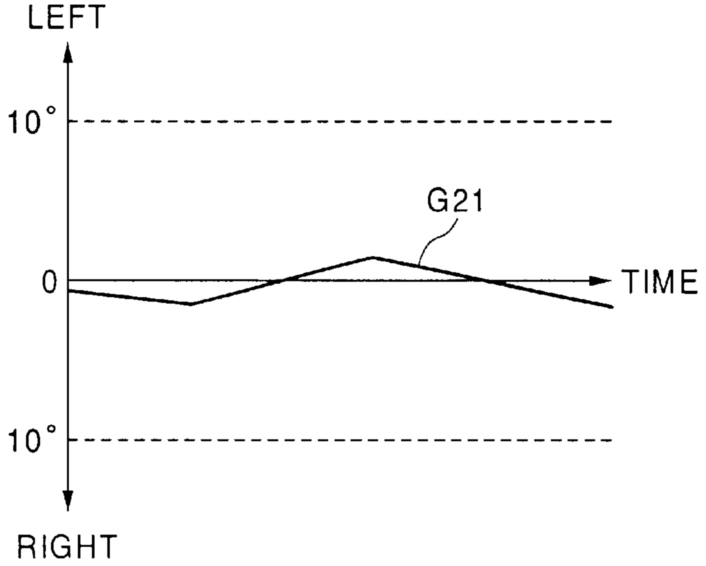
FIG. 3 is a graph showing how to diagnose a vehicle failure according to the second embodiment of the present invention.

For example, let us assume that the driver is trying to keep the steering wheel constant without turning the steering wheel, and drive the vehicle straight ahead. FIG. 3 is a graph illustrating the steering angle information collected by the information acquisition section 35 at this time. In FIG. 3, G21 represents a change in the steering angle with respect to the time elapsed, with the change being less than 10 degrees. From this figure, it can be seen that there is substantially no steering operation performed by the driver.

Figure 4:
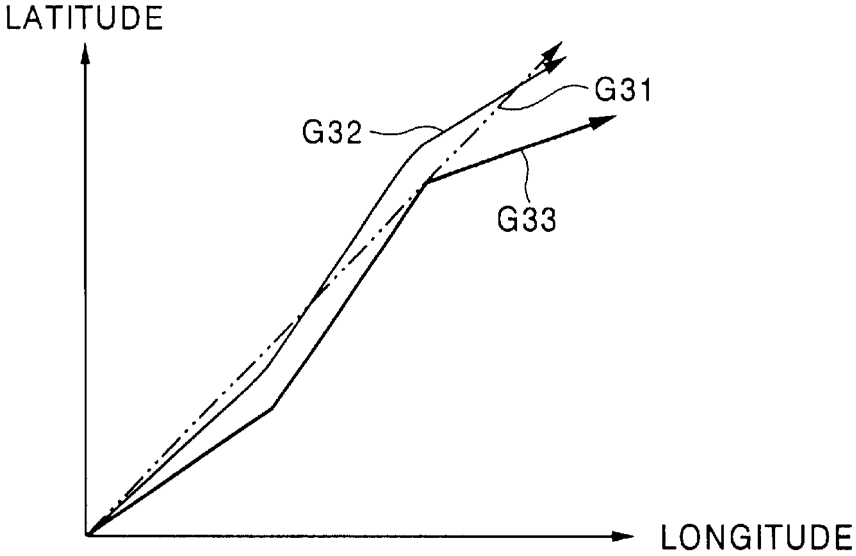
FIG. 4 is a graph showing how to diagnose a vehicle failure according to the second embodiment of the present invention.

In addition, FIG. 4 is a graph illustrating the vehicle travelling direction information and the vehicle position information collected simultaneously by the information acquisition section 35. In FIG. 4, G31 represents a predicted travelling direction of the vehicle obtained from the vehicle direction information; G32 represents a predicted change line of the vehicle position information estimated from G21; and G33 represents a change line of the actual vehicle position information.

The diagnosis section 36 detects a steering abnormality (i.e., abnormality in the steering system) from the information on G21 through G33 obtained from the information acquisition section 35 and can predict, based on the result of detection, the cause of the steering abnormality such as an abnormality in the steering angle sensor or an abnormality in the steering angle adjustment of the vehicle wheels or an abnormality in the GPS position information. That is, in the devices mounted on the vehicle which would be predicted to cause a problem if control system units affecting the safety of the vehicle and entertainment system units dealing with a great deal of data are connected with a single common network bus, providing a diagnosis section for each gateway dealing with data transmitted between the respective electronic controllers makes it possible to comprehensively diagnose the entire vehicle system, which could not otherwise be specified by means of the self-diagnosis function of each electronic controller alone.

Embodiment 3

Figure 5A:
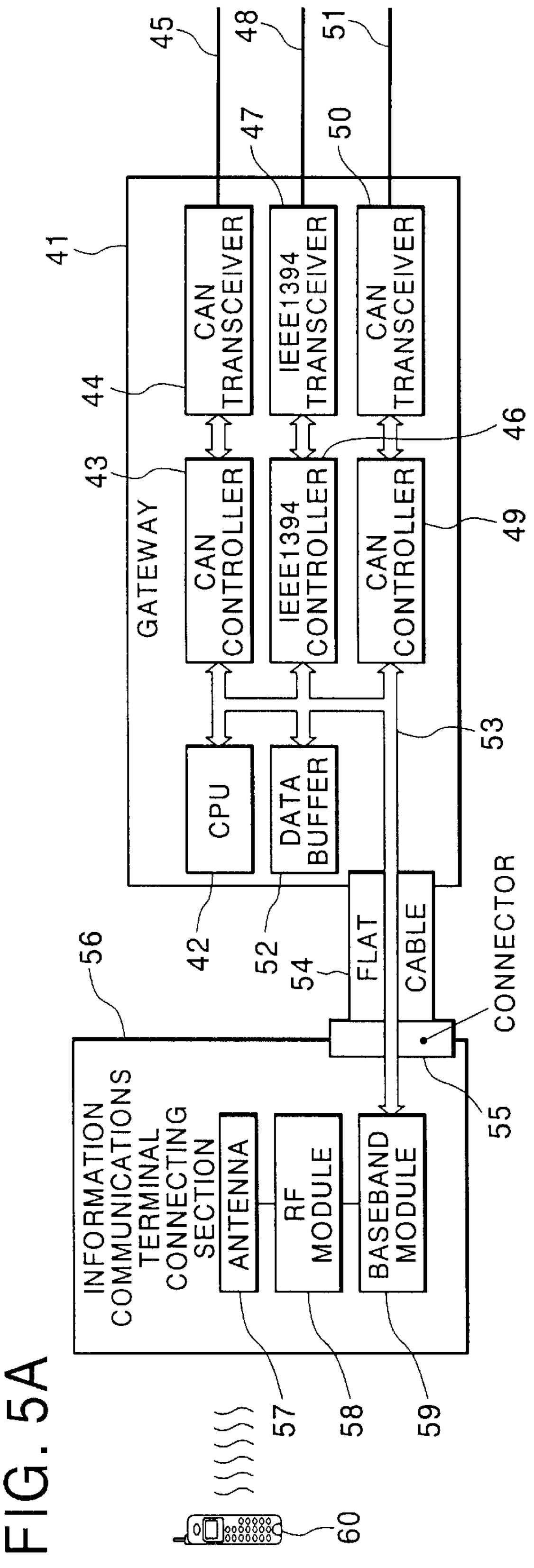
FIGS. 5A and 5B are block diagrams ilustrating the construction of a third embodiment of the present invention.
Figure 5B:
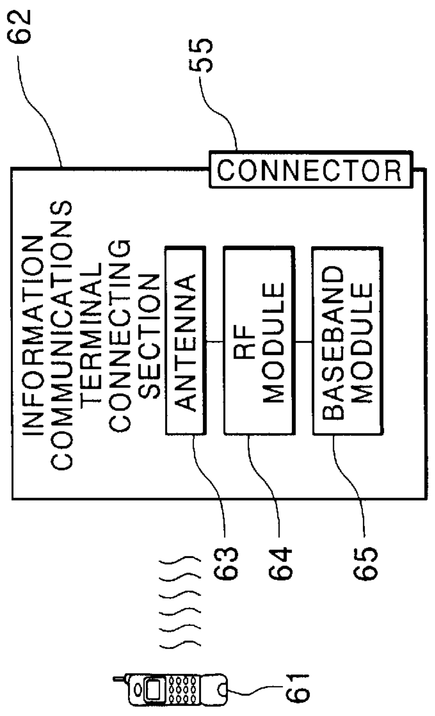

FIGS. 5A and 5B illustrate, in block diagrams, the construction of a failure diagnosis apparatus for a vehicle according to a third embodiment of the present invention. In FIGS. 5A and 5B, a gateway 41 enables communications between a plurality of network buses installed on a vehicle. A CPU 42 is mounted on the gateway 41. A CAN controller 43 transmits and receives a CAN message which is one of network protocols. The CAN transceiver 44 converts a message into a corresponding electric signal under the instruction of the CAN controller 43 to send it to a network bus, or it converts an electric signal received from the network bus into a corresponding message to notify it to the CAN controller 43. The CAN transceiver 44 is connected with a CAN network bus 45.

An IEEE 1394 controller 46 transmits and receives an IEEE 1394 message which is one of network protocols. The IEEE 1394 transceiver 47 converts a message into a corresponding electric signal under the instruction of the IEEE 1394 controller 46 to send it to a network bus, or it converts an electric signal received from the network bus into a corresponding message to notify it to the IEEE 1394 controller 46. The IEEE 1394 transceiver 47 is connected with an IEEE 1394 network bus 48.

In addition, reference numerals 49 through 51 designate a CAN controller, a CAN transceiver and a CAN network bus, respectively, for the CAN protocol similar to the elements 43 through 45, but here it is assumed that the elements 49 through 51 are connected with another local area network (LAN) different from one with which the elements 43 through 45 are connected.

A data buffer 52 buffers messages which are received by the CAN controllers 43, 49 and the IEEE 1394 controller 46 through a bus line 53. When the CPU 42 transmits a message, the data buffer 52 temporarily buffers the message.

A flat cable 54 connects the bus line 53 and a power supply line, etc., with an information communications terminal connecting section 56 to be described later through a connector 55. Here, note that the flat cable 54 includes, other than a so-called flat cable, a flexible line and the like which is used to extend the bus line 53 and the power supply line.

Moreover, the information communications terminal connecting section 56 is provided with an antenna 57, a radio frequency (RF) module 58 and a baseband module 59, and connects the gateway 41 to an information communications terminal in the form of a portable telephone 60 owned by the driver through wireless or radio communication.

As illustrated in FIG. 5B, for instance, reference numeral 61 is assumed to be another portable telephone which will be developed in the future, and which is different in a wireless connection system from the portable telephone 60 as illustrated in FIG. 5A. An information communications terminal connecting section 62 corresponds to the wireless connection system of the portable telephone 61, and is provided with an antenna 63, a radio frequency (RF) module 64, a baseband module 65 and a connector 55. The information communications terminal connecting section 62 is able to send data to the bus line 53 of the gateway 41 through the flat cable 54, as the information communications terminal connecting section 56 does.

Here, for example, let us consider the case where in the CPU 42, failure diagnoses are carried out on a plurality of electronic controllers connected with the CPU 42 through the network buses 45, 48 and 51, and the results of the diagnoses are transmitted to an external information center such as a car dealer, etc.

The results of the failure diagnoses conducted in the CPU 42 are notified, as a sending request or a sending message to the portable telephone, to the baseband module 59 of the information communications terminal connecting section 56 through the bus line 53. In the baseband module 59, the notified message is subjected to a magnitude conversion and then sent to radio frequency module 58. In the radio frequency module 58, the message received there is superimposed on a carrier wave and transmitted into the air through the antenna 57. The portable telephone 60 receives the message sent into the air, and notifies the received message to the information center through a portable telephone net. Here, note that though the received message is notified directly from the portable telephone net to the information center, the received message may instead be sent from the portable telephone net to the Internet or the like.

On the other hand, the message sent from the information center to the portable telephone net directly or by way of the Internet is received by the portable telephone 60 in the vehicle. The portable telephone 60 sends the content of the received message through wireless or radio communication. The antenna 57 of the information communications terminal connecting section 56 receives the content of the message. In the radio frequency module 58, the content of the received message is converted into a corresponding radio frequency, which is then transmitted to the baseband module 59. The baseband module 59 notifies the waveform of the message through the bus line 54 to the CPU 42, in which proper processing is conducted.

That is, the data of the plurality of electronic controllers in the vehicle is processed in the gateway 41, and the data thus processed is able to be transmitted outside the vehicle through the portable telephone 60, whereas the data notified from the external information center is able to be received by the portable telephone, and processed in the gateway 41. Accordingly, it becomes possible for the driver to exchange a message between the vehicle and the external information center without conducting the procedure of consciously connecting the portable telephone with the equipment mounted on the vehicle.

On the other hand, let us assume that the driver buys and owns a new portable telephone, i.e., the portable telephone 61, as shown in FIG. 5B, that is different in the wireless communication system from the one depicted in FIG. 5A.

In this case, the information communications terminal connecting section 56 in the vehicle as shown in FIG. 5A is detached and removed in a car dealer or the like, and in place thereof, a new information communications terminal connecting section 62 corresponding to the wireless or radio communication system of the portable telephone 61 as shown in FIG. 5B is connected with the flat cable 54 through the connector 55 as shown in FIG. 5A. This serves to enable the existing apparatus to be adapted to the new wireless or radio communication system while reducing the cost of exchange as compared with the case in which the gateway 41 itself is replaced with a new one.

Embodiment 4

Figure 6:
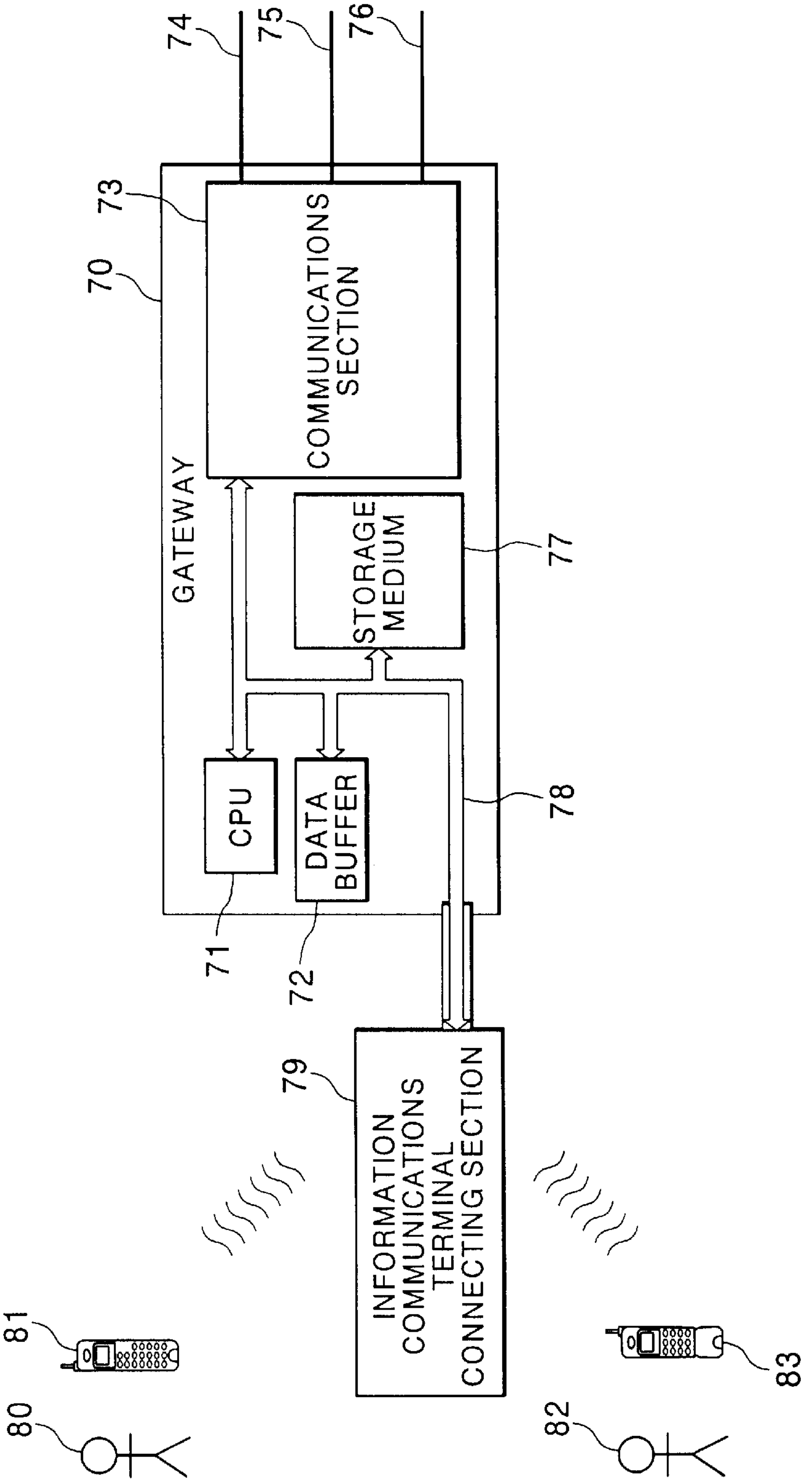
FIG. 6 is a block diagram illustrating the construction of a fourth embodiment of the present invention.

FIG. 6 illustrates, in a block diagram, the construction of a failure diagnosis apparatus for a vehicle according to a fourth embodiment of the present invention. In FIG. 6, a gateway 70 enables communications between a plurality of kinds of network buses. The gateway 70 includes a CPU 71, a data buffer 72, a communications section 73 and a storage medium 77 mutually connected with one another through a bus line 78. The communications section 73 is connected with a plurality of network buses 74 through 76 mounted on a vehicle for communications with a plurality of electronic controllers also mounted on the vehicle. The network buses 74 through 76 may be of different kinds, respectively, or of the same kind. The storage medium 77 is preferably a nonvolatile storage medium such as a flash ROM, etc., which can maintain the contents stored therein even if the power supply to the gateway 70 is interrupted.

In addition, an information communications terminal connecting section 79 can be connected with an information communications terminal such as a portable telephone through wireless or radio communications for controlling the transmission of information from the portable telephone to the bus line 78 as well as the transmission of data, which is notified to the gateway 70 through the bus line 78, to the portable telephone.

Further, reference numeral 80 represents the authorized user or owner of the vehicle, and reference numeral 81 represents a portable telephone owned by the vehicle owner, whereas reference numeral 82 represents a third party, and reference numeral 83 represents a portable telephone owned by the third party 82.

When a person or the authorized owner 80 buys a vehicle, intrinsic or characteristic information specific to the portable telephone owned by the person such as the physical address of the portable telephone 81 is stored in the storage medium 77 at a car dealer or the like. Here, note that intrinsic information specific to a portable telephone owned by another person or authorized user such as a family member, employee of the dealer, etc., who is permitted to handle the same vehicle may be stored in the storage medium 77.

When the authorized owner 80 usually uses the vehicle, the information communications terminal connecting section 79 attempts to establish connection with the portable telephone 81 through wireless or radio communications. In this case, the information communications terminal connecting section 79 acquires intrinsic or characteristic information such as the physical address of the portable telephone 81, and compares it with the same information which is stored in advance in the storage medium 77. If the intrinsic information of the portable telephone 81 and the intrinsic information stored in the storage medium 77 coincides with each other, it is determined that the person having the portable telephone 81 is the authorized owner or user, thus permitting that person to use the vehicle in a usual manner.

On the contrary, when the third party 82 attempts to get into the vehicle for the purposes of theft, vandalization and the like, the information communications terminal connecting section 79 similarly makes connection with the portable telephone 83 through wireless or radio communications system as described above, acquires intrinsic information such as the physical address of the portable telephone 83, and compares it with the information which is stored in advance in the storage medium 77.

However, the intrinsic information of the portable telephone 83 is not registered or recorded in the storage medium 77, and hence the gateway 70 regards this person as a third party who is not the authorized owner, and stores this information in the storage medium 77.

Note that at this time, private information, such as the telephone number of the portable telephone 83, of the third party 82 who has the portable telephone 83 may be stored in the storage medium 77. Moreover, in addition to storing the private information, the control which affects the operation of the vehicle may be limited or canceled. Besides, a notification may be made to an external organization such as an information center, the police or the like by using the portable telephone 83.

Embodiment 5

Figure 7:
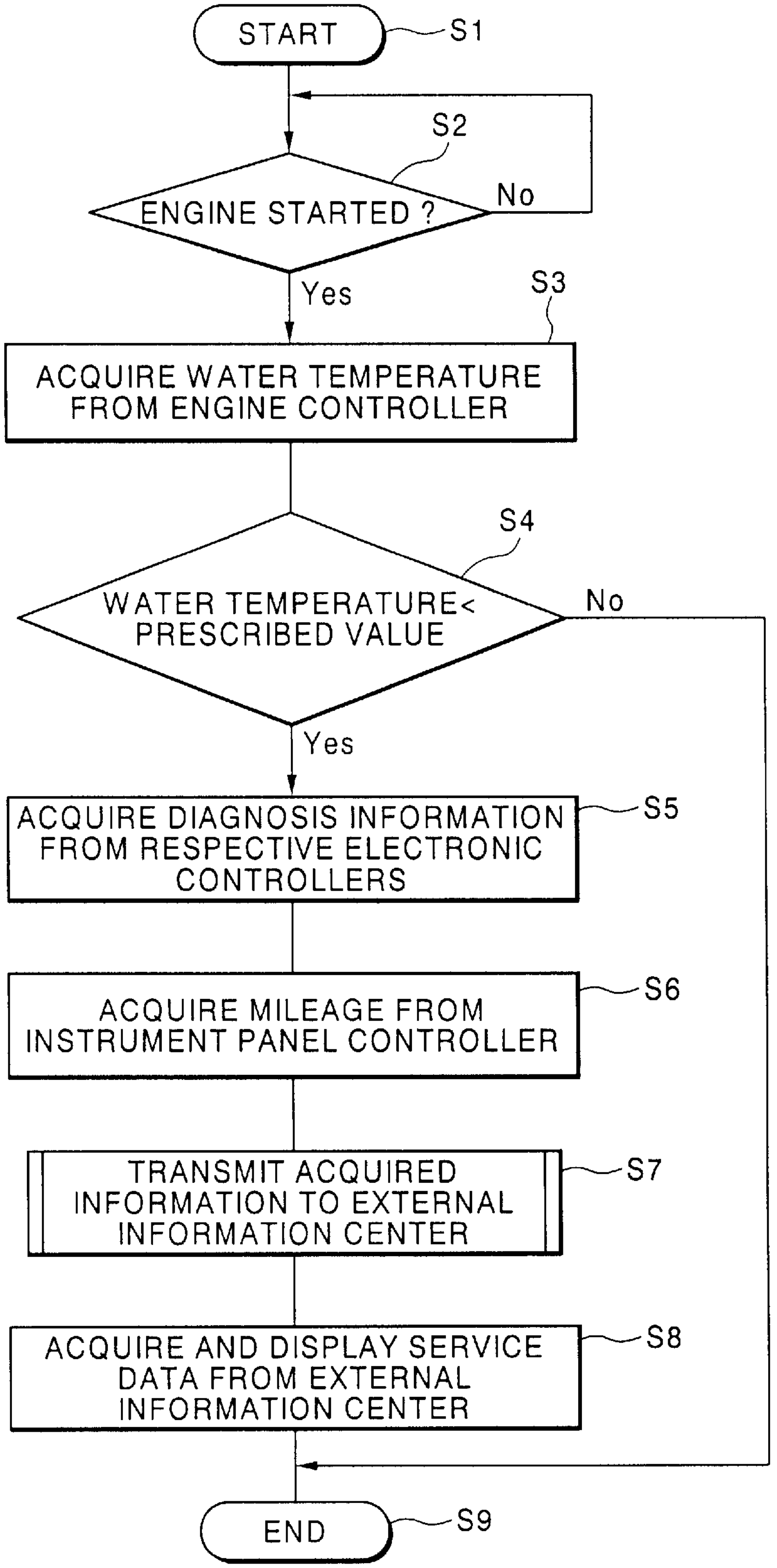
FIG. 7 is a flow chart illustrating the flow of operations from the beginning of a failure diagnosis service to the end thereof according to a fifth embodiment of the present invention.

FIG. 7 is a flow chart for explaining a failure diagnosis apparatus for a vehicle according to a fifth embodiment of the present invention. This flow chart shows an operation sequence of the apparatus when the daily inspection of a vehicle having an external communications function as in the above-described embodiments is done automatically with the availability or utilization rate of external connections (e.g., the number of connections to an external information center) of about once a day, in order to improve the availability of the external communications function and hence the profits of dealers, communications-related companies, etc., and at the same time to provide benefits to the owner of the vehicle.

First of all, in step S1, an automatic daily inspection sequence is started.

When the driver starts the engine of the vehicle for the purpose of commutation in the morning for instance, the starting of the engine is ascertained in step S2, and then the control process proceeds to step S3.

In step S3, information on the temperature of engine-cooling water possessed by the engine controller is acquired, and the control process proceeds to step S4.

In step S4, from the fact that the water temperature is sufficiently low, for instance, at the time of commutation in the morning, it is determined that the engine starting is the first of the day, and the control process proceeds to step S5. Here, note that when the engine is restarted in a few minutes after the engine is stopped, the water temperature becomes high and is not below a prescribed value in the case of a vehicle such as a home-delivery car in which the starting and stopping of the engine are frequently repeated, so it is determined that the engine starting is not the first of the day. Thereafter, the control process proceeds to step S9 where this service is ended.

In step S5, the data such as one for the sensors and actuators needed for inspection is acquired from the respective electronic controllers, and the control process proceeds to step S6.

In step S6, mileage data is further acquired from an instrument panel controller, and the control process proceeds to step S7.

In step S7, the data acquired for inspection in the above steps is transmitted to an external information center to request the service thereof.

In the information center, the data for inspection received there is ascertained to determine whether the data is normal or abnormal, and the processing is made in accordance with the results of the determination. In addition, the time for exchanging the articles of consumption is estimated from the mileage data. If it is the time for exchange, the data for guiding an exchange service, etc., is also sent to the vehicle at the same time together with the data of the inspection results.

When the data of the above-mentioned inspection results, etc., are received by the vehicle, the data is displayed to the driver in step S8, and the service is ended in step S9.

The above operations are controlled, for instance, by the CPU in the gateway in the third or fourth embodiment as illustrated in FIGS. 5A, 5B or FIG. 6.

Embodiment 6

Figure 8:
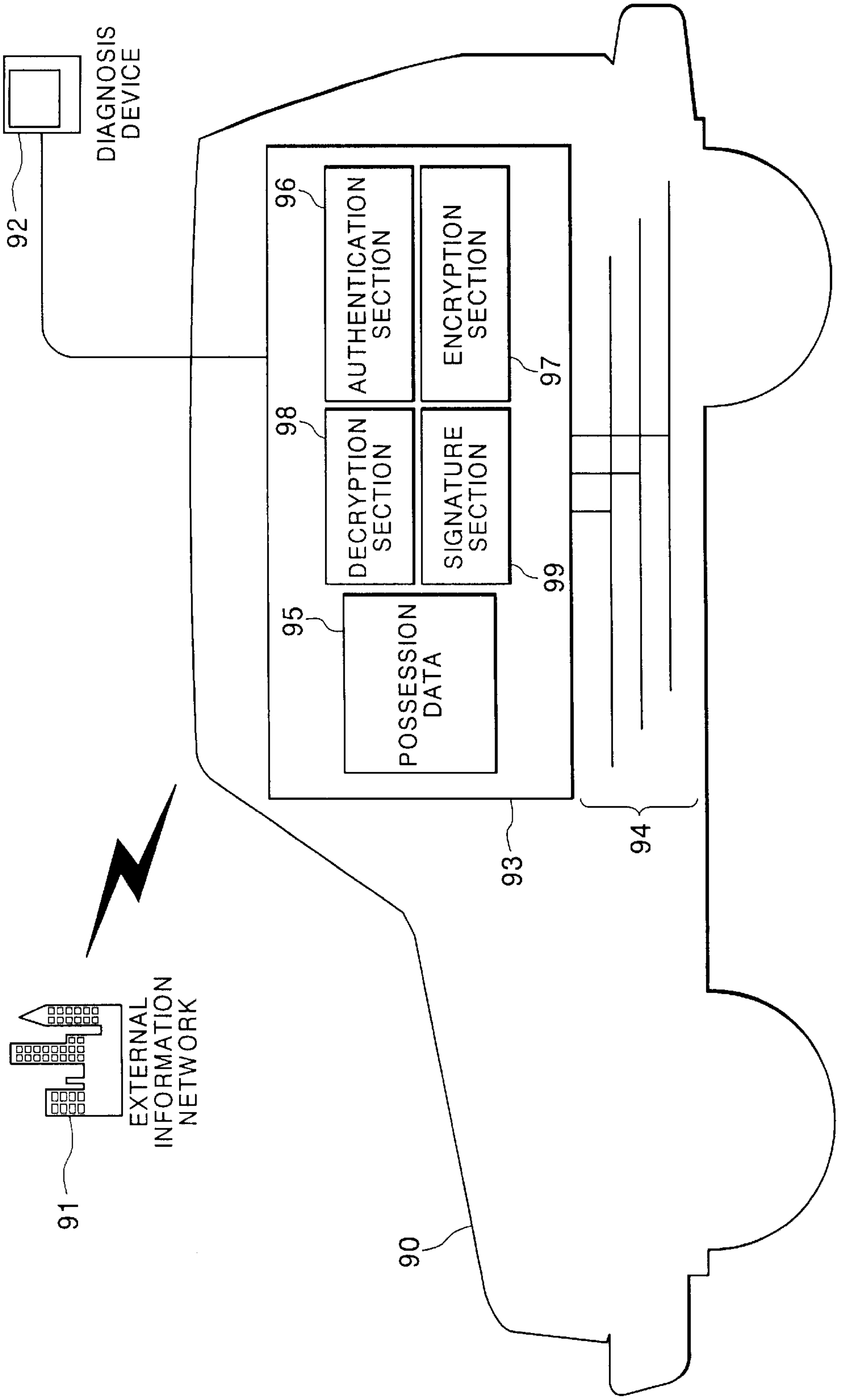
FIG. 8 is a block diagram illustrating the construction of a sixth embodiment of the present invention.

FIG. 8 illustrates, in a block diagram, the construction of a failure diagnosis apparatus for a vehicle according to a sixth embodiment of the present invention. In FIG. 8, reference numeral 90 represents a vehicle: reference numeral 91 represents an external information network which can exchange data with the vehicle 90; and reference numeral 92 represents a vehicle diagnosis device that is installed in a dealer or the like.

A gateway 93 enables connection between a plurality of electronic controllers mounted on the vehicle 90 by way of a network bus 94. Possession data 95 such as vehicle information, etc., is obtained from the plurality of electronic controllers through the network bus 94, and stored in a storage medium such as a memory, etc. An authentication section 96 authenticates whether the node accessing the gateway 93 is a formal node registered, and refuses connection with an informal node (i.e., node not registered) or imposes a certain restriction thereon. An encryption section 97 encrypts the possession data 95 so as to prevent its leakage to third parties. A decryption section 98 decrypts data from other nodes with a release key when the data is encrypted, To prove whether the possession data 95 has been falsified by a third party, when data is possessed as the possession data 95, a signature section 99 performs a prescribed calculation, which is kept secret to third parties, by the use of the possession data 95, and preserves the result obtained. Consequently, when a similar calculation is done to the possession data which has been falsified by a third party, the result of such a calculation differs from the preserved result, so the signature section 99 can find the falsification. The authentication section 96, the encryption section 97, the decryption section 98 and the signature section 99 together constitute an information protection processing section for performing protection processing to the possession data. Here, note that the authentication section 96 may include public key cryptography, etc., for preventing third parties from deciphering a code, by exchanging an encryption key with an accessing node while keeping a decryption key secret when authentication with the assessing node is properly done.

With the above construction, for instance, let us assume that a third party has acquired the data of vehicle information transmitted exteriorly from the vehicle 90 by utilizing the external information network 91 for the purpose of eavesdropping or the like. However, since the vehicle 90 transmits vehicle information exteriorly, authentication with the accessing node has already been completed by the authentication section 96, and hence the encryption key is exchanged so that the vehicle information is encrypted by the encryption section 97. As a result, the third party having no decryption key can not decipher the encrypted vehicle information.

In addition, when the third party tries to read the possession data 95 in the vehicle or data from the plurality of electronic controllers by using a connector for connection with the vehicle diagnosis device 92, or when the third party tries to transmit illegal data from the connector to the electronic controllers, for instance, authentication is not conducted properly by the authentication section 96 since the connector is not a node to which the vehicle diagnosis device 92, etc., is registered in advance. As a result, it is impossible to read internal data in the vehicle or illegally transmit data.

Moreover, even if a third party has illegally rewritten the possession data 95 such as failure diagnosis results, etc., possessed by the gateway 93, for instance, the result of calculation signed by the signature section 99 differs from the result of calculation after rewriting by the signature section 99. Therefore, it is proven that an illegal rewriting has been done, and hence trouble by illegal data is not caused.

Embodiment 7

Figure 9:
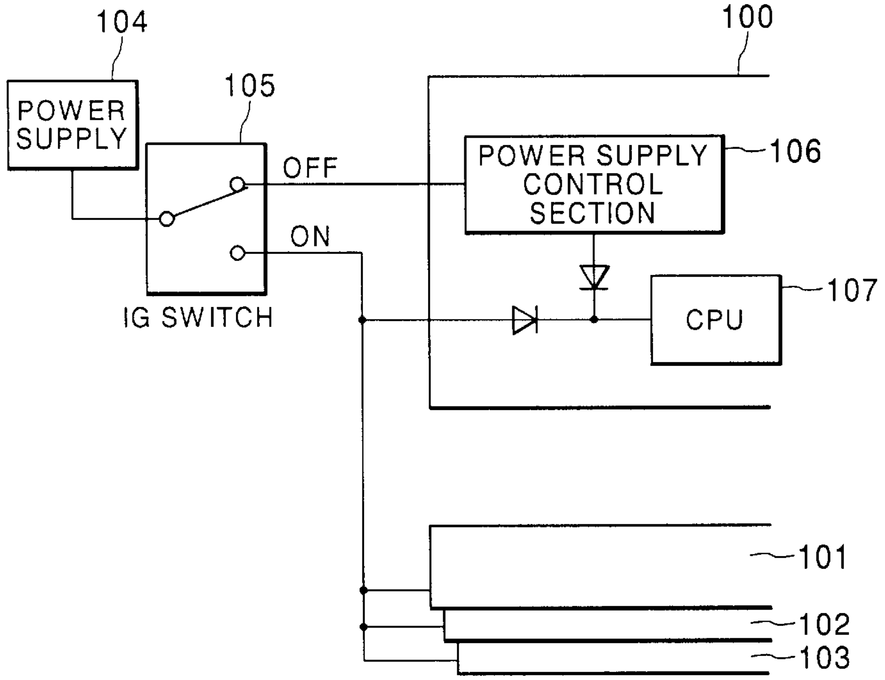
FIG. 9 is a block diagram illustrating the construction of a seventh embodiment of the present invention.

FIG. 9 illustrates, in a block diagram, the construction of a failure diagnosis apparatus for a vehicle according to a seventh embodiment of the present invention. In FIG. 9, reference numeral 100 designates a gateway installed on a vehicle, and reference numerals 101 through 103 designate a plurality of electronic controllers installed on the vehicle. The gateway 100 and the electronic controllers 101 through 103 are connected with a power supply 104 such as a battery through an ignition switch 105. A power supply control section 106 is mounted on the gateway 100 for controlling the supply of electric power. The gateway 100 includes a CPU 107.

During normal travelling of the vehicle, i.e., when the ignition switch 105 is in an "ON" state, the power supply 104 is electrically connected with the gateway 100 and the electronic controllers 101 through 103, so that they perform control operations, respectively.

On the other hand, the supply of electric power to the electronic controllers 101 through 103 is cut when the engine is stopped or the vehicle is parked with the ignition switch 105 being in an "OFF" state, but power is supplied to the power supply control section 106 of the gateway 100.

The power supply control section 106 monitors the electric power supplied thereto, and supplies the power to the CPU 107 at a cycle of once per a few seconds. Here, note that the power supply control section 106 may be constructed to supply power to the CPU 107 continuously or at all times instead of the intermittent supply of power. In addition, the CPU107 may have a power saving mode, and the CPU 107 may be shifted to the power saving mode by switching of the ignition switch 105.

Since power is supplied from the power supply 104 to the CPU 107 under the control of the power supply control section 106, the gateway 100 is able to perform the prescribed operation even in the state of the ignition switch 105 being turned off.

Embodiment 8

Figure 10:
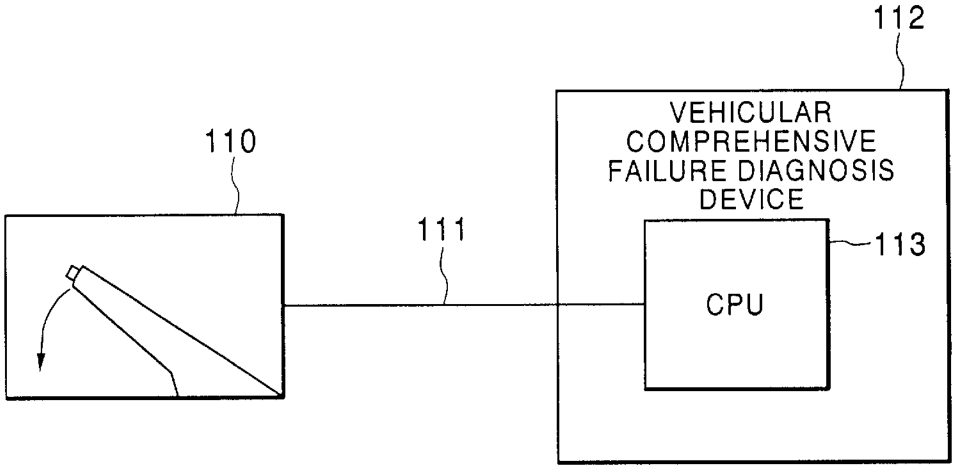
FIG. 10 is a block diagram illustrating the construction of an eighth embodiment of the present invention.

FIG. 10 illustrates, in a block diagram, the construction of a failure diagnosis apparatus for a vehicle according to an eighth embodiment of the present invention. In FIG. 10, reference numeral 110 represents a trigger such as a parking brake which is used by a diagnosis service user to express user's will to cancel the failure diagnosis service, and this may be done by an operation of placing a shift lever from a parking position "P" into a driving position "D". Reference numeral 111 designates a signal line or conductor for notifying the fact that the service user has expressed the cancellation will such as by operating the parking brake 110, and such a notification may be sent as an interrupt signal.

A vehicular comprehensive failure diagnosis device 112 is provided on a gateway, and it constitutes a means mounted on the vehicle for diagnosing a plurality of electronic controllers and a plurality of objects to be controlled thereby in the vehicle. The vehicular comprehensive failure diagnosis device 112 includes a CPU 113 which is a processor to actually perform failure diagnoses.

Now, let us assume that the service user is using the failure diagnosis service of the failure diagnosis device 112 for inspection before driving.

When there happens a request for canceling the failure diagnosis service to start the vehicle at once for the sake of service user's convenience, the service user need not do any particular or complicated operations but follow the ordinary procedure of starting the vehicle. That is, the user simply pushes down or releases the parking brake 110 in a usual manner, whereupon a cancellation signal is transmitted to the CPU 113 mounted on the failure diagnosis device 112 through the signal line 111.

Upon receipt of the cancellation signal, the CPU 113 immediately stops the failure diagnosis service and shifts to a usual operating condition. Thus, the service user can cancel the failure diagnosis service without performing any special operation, and drive the vehicle as usual.

Embodiment 9

Figure 11:
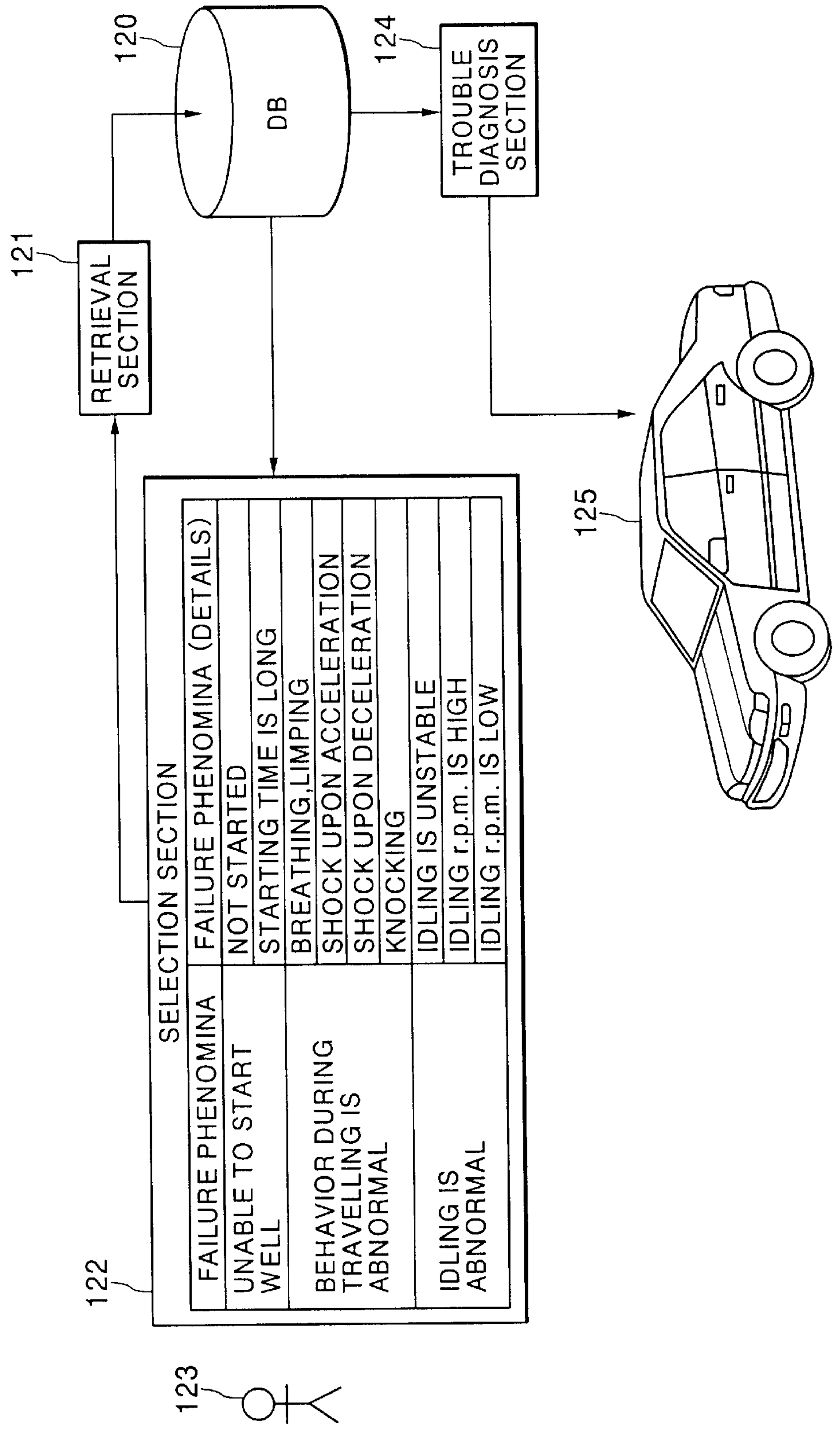
FIG. 11 is a block diagram illustrating the construction of a ninth embodiment of the present invention.

FIG. 11 illustrates, in a block diagram, the construction of a failure diagnosis apparatus for a vehicle according to a ninth embodiment of the present invention. In FIG. 11, a data base 120 stores information about phenomena caused by possible failures which would take place in a vehicle 125 as well as diagnosis procedures necessary to diagnose the phenomena. A retrieval section 121 searches the data base 120 for a failure phenomenon and a corresponding diagnosis procedure for diagnosing the failure phenomenon using the failure phenomenon as a search term. A selection section 122 acquires from the data base 120 failure phenomena which can take place in the vehicle 125, converts them into appropriate forms from which the user can make a selection, and presents them in the converted forms to the user. Reference numeral 123 designates an owner of the vehicle 125. A trouble diagnosis section 124 receives a diagnosis procedure retrieved from the data base 120 as a result of the search performed by the retrieval section 121, and actually diagnoses the vehicle 125 according to the diagnosis procedure. The data base 120, the retrieval section 121 and the trouble diagnosis section 124 are included in the gateway. Additionally, in FIG. 12, reference numeral 126 represents one example of the data stored in the data base 120.

Now, assume that the owner 123 of the vehicle 125 feels trouble in the vehicle 125, and is about to start a diagnosis. Here, the content of the trouble is supposed to be that the owner 123 tried to start the engine but felt too long a starting time until the engine had been started.

In this case, the selection section 122 converts the failure phenomena registered in the data base 120 into an owner's selectable form as a list.

The owner 123 selects the failure phenomenon generated in the vehicle 125 from the list of the failure phenomena presented by the selection section 122. In other words, the owner 123 selects an item "starting time is long" from a category "unable to start well" in the failure phenomena of the data 126. The selection section 122 notifies the retrieval section 121 of the selected failure phenomenon. The retrieval section 121 searches the data base 120 by using the notified failure phenomenon "unable to start well—staring time is long" as a search term.

The diagnosis procedure acquired as a result of the retrieval is a one described as "battery voltage, ignition coil, injector, and stepping motor", which is then notified to the trouble diagnosis section 124. In accordance with the notified diagnosis procedure "battery voltage, ignition coil, injector, and stepping motor", the trouble diagnosis section 124 diagnoses these elements of the vehicle 125.

In other words, it is not necessary for the owner 123 of the vehicle 125 to orally tell a dealer the trouble occurring in the vehicle 125. Also, in the dealer, an accurate failure diagnosis can be done without the need of learning a diagnosis manual, thus making it possible to improve the working efficiency.

Here, note that any of the data base 120, the retrieval section 121, the user selection section 122 and the trouble diagnosis section 124 may be installed on the vehicle 125, or they may be arranged in an information center of the dealer or the like so that they can be utilized through wireless or radio communications from the vehicle 125. In addition, in the trouble diagnosis section 124, the function thereof may be carried out by the manual operation of a service person, etc., or by the automatic operation of a machine.

It should be noted that a failure diagnosis apparatus for a vehicle according to the present invention is not limited to the above-mentioned respective embodiments in any manner, but various changes or modifications thereof can of course be made without departing from the scope or spirits of the present invention as defined by the appended claims.

As described in the foregoing description, the present invention can provide the following remarkable advantages.

According to the present invention, even with a vehicle having difficulty in connecting all the electronic controllers with a common network bus and having a plurality of different kinds of network buses, it is possible to collect the operating conditions of the respective electronic controllers through the network buses, whereby a comprehensive diagnosis can be made by performing failure diagnoses based on mutual relations between the respective electronic controllers.

Further, wiring arrangements, connecting operations and the like are not required for the purpose of making portable telephones available. Thus, the assembly cost can be suppressed, and the user can avoid feeling troublesomeness.

Moreover, even if there is a change in the communications system for communicating with portable telephones, the user or the owner of the vehicle can use the similar service as before.

In addition, in the event that the vehicle was stolen, the information on a portable telephone carried by a criminal and the criminal's private information stored in the portable telephone can be preserved as electronic information effective to specify the criminal, thereby making it possible to shorten the time required to solve the problem.

Furthermore, even in the case of vehicles of recent years which are less prone to failure, it is possible to provide the users with services such as inspection of the vehicles before driving. As a result, even if the information center side does not catch the operating conditions of all the vehicles to be serviced, an information distributor can enclose the users easily. Therefore, the profits on the information distributor side providing the service can be improved.

On the other hand, information leakage outside the vehicle can be prevented, and even if vehicle information should be leaked, the information is protected so it is possible to prevent resultant damage.

Moreover, it is possible to perform diagnoses on necessary controllers under an environment difficult to diagnose such as at the time of an ignition key being turned off, at the time of engine starting, etc.

Still further, it is possible to freely cancel the automatically operated failure diagnosis service according to user's convenience.

Besides, in case where a diagnosis is conducted by a diagnosis device installed in the place of a dealer, it is not necessary for the driver of a vehicle to orally tell the dealer the condition of trouble occurring in the vehicle. In addition, even if the dealer does not know about a diagnosis manual, the dealer can obtain the result of the failure diagnosis according to a correct diagnosis procedure, thus carrying out the failure diagnosis in an efficient manner.

What is claimed is:

1. A failure diagnosis apparatus for a vehicle in which a plurality of electronic controllers mounted on the vehicle are connected with one another by means of a plurality of network buses for transmitting data between the electronic controllers through the network buses, said apparatus including a gateway with a protocol conversion section for enabling said plurality of electronic controllers to mutually communicate with one another through said plurality of network buses, said gateway comprising:

an information acquisition section for acquiring at least one of control information and diagnosis information about diagnoses respectively performed by said plurality of electronic controllers; and a failure diagnosis section for diagnosing failure of the vehicle by using said at least one of control information and diagnosis information acquired by said information acquisition section.

2. The failure diagnosis apparatus for a vehicle according to claim 1, further comprising an information communications terminal connecting section adapted to be connected to an information communications terminal through wireless communications to enable communications with a device outside the vehicle.

3. The failure diagnosis apparatus for a vehicle according to claim 2, wherein said information communications terminal connecting section is replaceable witha different information communications terminal connection section corresponding to a different information communications terminal.

4. The failure diagnosis apparatus for a vehicle according to claim 2, wherein said gateway further comprises an intrinsic information storage section which acquires intrinsic information possessed by said information communications terminal and stores the acquired intrinsic information of said information communications terminal.

5. The failure diagnosis apparatus for a vehicle according to claim 2, wherein said gateway starts a diagnosis when detected information on a condition of the vehicle satisfies a prescribed condition.

6. The failure diagnosis apparatus for a vehicle according to claim 1, wherein said gateway further comprises an information protection processing section for performing protection processing of possession data, said information obtained from said plurality of electronic controllers connected with said plurality of network buses being protected by using said information protection processing section.

7. The failure diagnosis apparatus for a vehicle according to claim 1, wherein said gateway further comprises a power supply control section which is connected with a power supply for supplying power to a CPU when an ignition key is in an "OFF" state, thereby enabling said gateway to perform a prescribed operation in the state of said ignition key being turned off.

8. The failure diagnosis apparatus for a vehicle according to claim 1, wherein said gateway cancels a diagnosis service under use based on a diagnosis service cancellation signal.

9. The failure diagnosis apparatus for a vehicle according to claim 1, further comprising:

a data base having information about failure phenomena and diagnosis procedures necessary to diagnose the failure phenomena;

a retrieval section for retrieving from said data base, said diagnosis procedures based on said failure phenomena; and a trouble diagnosis section for acquiring a diagnosis procedure for diagnosing a failure phenomenon generated in the vehicle from said data base by use of said retrieval section, said trouble diagnosis section being operable to diagnose said plurality of controllers according to the acquired diagnosis procedure.

10. The failure diagnosis apparatus for a vehicle according to claim 7, wherein said power supply supplies power to the CPU continuously when an ignition key is in an "OFF" state.

11. The failure diagnosis apparatus for a vehicle according to claim 7, wherein said power supply supplies power to the CPU intermittently when an ignition key is in an "OFF" state.

12. The failure diagnosis apparatus for a vehicle according to claim 1, wherein one or more of the network buses differ from the other network buses.

13. The failure diagnosis apparatus for a vehicle according to claim 8, wherein said diagnosis service cancellation signal is generated in response to a user action.

14. The failure diagnosis apparatus for a vehicle according to claim 13, wherein said user action is a normal user interaction with said vehicle.

15. The failure diagnosis apparatus for a vehicle according to claim 9, further comprising:

a selection section for converting the failure phenomenon retrieved from the database into a list of selectable failure symptoms;

wherein a user selects one or more failure symptoms from the list;

wherein said selection section informs said retrieval section of the selected failure symptoms;

wherein said retrieval section searches said data base for the diagnosis procedures corresponding to the selected failure symptoms; and wherein said trouble diagnosis section automatically executes said diagnosis procedures corresponding to the selected failure symptoms.

16. The failure diagnosis apparatus for a vehicle according to claim 15, wherein one or more of said data base, said retrieval section, said trouble diagnosis section, and said selection section are installed on said vehicle.

17. The failure diagnosis apparatus for a vehicle according to claim 15, wherein one or more of said data base, said retrieval section, said trouble diagnosis section, and said selection section are not installed on said vehicle.

* * * * *